United States Patent [19]

Piane, Sr.

[11] Patent Number: 5,385,085

[45] Date of Patent: Jan. 31, 1995

[54] MULTIPLE UNIT WOK APPARATUS

[75] Inventor: Robert A. Piane, Sr., Wilmington, Del.

[73] Assignee: Piane Equipment, Inc., Wilmington, Del.

[21] Appl. No.: 172,612

[22] Filed: Dec. 22, 1993

Related U.S. Application Data

[63] Continuation of Ser. No. 484,898, Feb. 26, 1990, abandoned, which is a continuation-in-part of Ser. No. 408,772, Sep. 18, 1989, abandoned.

[51] Int. Cl.$^6$ .......................... A47J 27/00; A47J 37/1
[52] U.S. Cl. ........................ 99/422; 99/448; 126/376; 126/390; 220/912
[58] Field of Search ............ 99/339, 422–424, 99/425, 446, 448, 449, 375, 397; 126/390, 373; 220/4.21–4.25, 23.2, 23.4, 23.8, 912; 426/523, 114; 219/432, 525

[56] References Cited

U.S. PATENT DOCUMENTS

| 75,095 | 3/1868 | Whitehouse | 220/4.25 |
| 993,169 | 5/1911 | Hudson | 99/424 |
| 1,072,892 | 9/1913 | Wilson | 99/426 |
| 1,204,682 | 11/1916 | Nash | 99/424 |
| 2,674,536 | 4/1954 | Fisher | 99/448 |
| 2,722,173 | 11/1955 | Cunningham | 126/390 |
| 3,511,433 | 5/1970 | Andrews et al. | 220/4.23 |
| 3,719,507 | 3/1973 | Barden | 99/448 |
| 4,096,986 | 6/1978 | Florian | 220/4.23 |
| 4,574,277 | 3/1986 | Bohl | 126/390 |
| 4,666,727 | 5/1987 | Wang | 99/425 |

Primary Examiner—Timothy F. Simone
Attorney, Agent, or Firm—E. Alan Uebler

[57] ABSTRACT

A multiple unit wok apparatus is provided for simultaneously cooking separate ingredients and, when cooked, the ingredients can be easily mixed together if desired. The individual wok units are attached together.

4 Claims, 2 Drawing Sheets

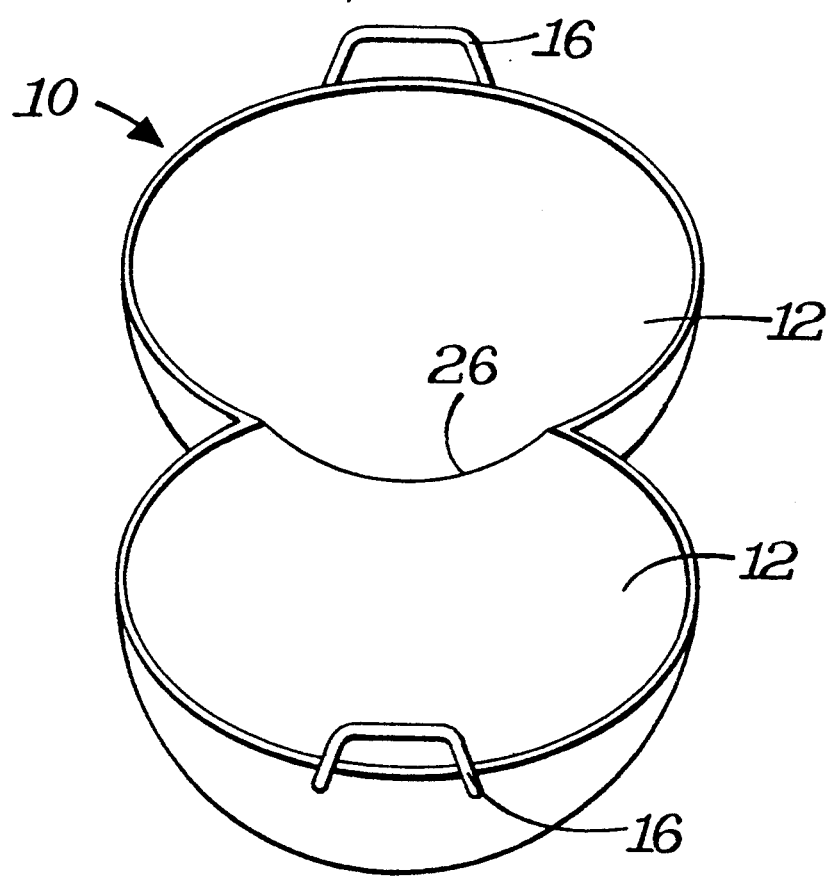

MULTIPLE UNIT WOK APPARATUS

CROSS-REFERENCE TO RELATED APPLICATION

This application is a continuation of prior copending application Ser. No. 07/484,898, filed Feb. 26, 1990, now abandoned, which is a continuation-in-part of my prior copending application Ser. No. 07/408,772, filed Sep. 18, 1989, now abandoned.

BACKGROUND OF THE INVENTION

This invention relates to apparatus for cooking food, namely the wok.

Cooking food in a wok is an ancient art. The vessel serves many functions and therefore replaces many Western utensils. To prepare many recipes, a cook generally needs two woks, one for oil and one for water steaming.

A single wok is normally about fourteen inches in diameter and is made of carbon steel or other metals including stainless steel, cast iron, aluminum and copper.

The basic techniques of wok cooking include stir-frying, deep frying and steaming. Stir-frying involves cooking pre-cut pieces of food in small amounts of oil over high heat for short periods of time. Deep frying involves the use of considerably more oil than stir-frying, but this oil, rather than the hot surface of the wok, acts as the heat-transfer medium. The oil should be heated to approximately 375° before the food is added. Surprising and pleasing results can often be achieved with this method. In steaming, the wok is used as a water vessel in which either a perforated aluminum tray or bamboo basket is placed. The food platter is placed on top of the tray or basket, covered and steamed over high heat.

One of the objects of the present invention is to provide means for a cook to conveniently and easily employ more than one of these methods of wok cooking simultaneously.

SUMMARY OF THE INVENTION

Multiple unit wok apparatus is provided comprising at least two similar wok bowls affixed together. Specifically, a multiple unit wok apparatus is provided comprising at least two similar wok bowls affixed together adjacent an intersecting joint therebetween, the intersecting joint being arcuate downwardly when the apparatus is in the cooking position, thereby allowing cooked or partially cooked foods and juices to be shifted easily from one wok bowl to another by the cook, using a spoon, spatula or other appropriate tool, with substantially no spillage. The apparatus preferably has two similar wok bowls.

BRIEF DESCRIPTION OF THE DRAWINGS

FIG. 4 is a perspective view of the double wok configuration showing the downwardly extending intersecting joint connecting the double woks.

DETAILED DESCRIPTION OF THE INVENTION AND PREFERRED EMBODIMENTS WITH REFERENCE TO THE DRAWINGS

A multiple unit wok apparatus is provided for simultaneously cooking separate ingredients and, when cooked, the ingredients can be easily mixed together if desired. The individual wok units are attached together.

Figure 1:
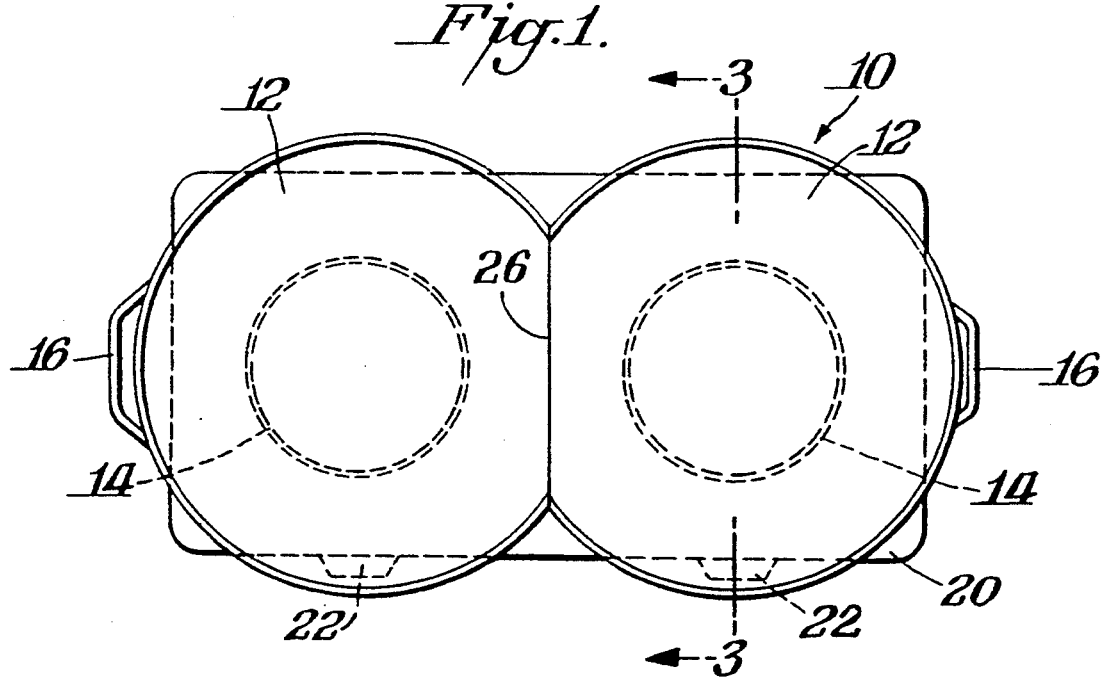
FIG. 1 is a top plan view of a double wok configuration according to the invention.

A detailed description of the invention is best provided with reference to the drawings wherein FIG. 1 is a top plan view of a double wok configuration according to the invention. The multiple wok apparatus 10 includes two wok bowls 12, each bowl 12 resting on a base 14 and each bowl 12 having a handle 16. The bowls 12 are connected together, described more fully below.

Figure 2:
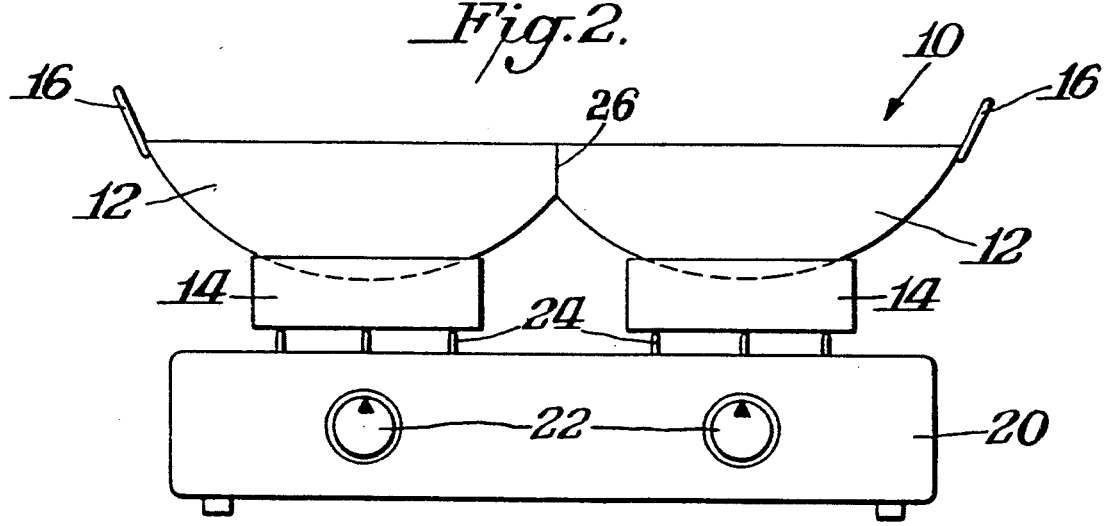
FIG. 2 is a front elevational view of the double wok configuration of FIG. 1.

FIG. 2 is a front elevational view of the double wok configuration 10 showing the two bowls 12 resting or affixed to the two bases 14 which in turn sit on stove or burner assembly 20. The two bowls may be cast together or individual bowls may be welded together or affixed together at arcuate joint 26 by any convenient means. As shown in FIG. 2, the two individual woks 12, 12 have a cut-out section in the rim of each and the two woks are affixed together such that the cut-out sections mate at their downwardly arcuate intersection 26, also shown in FIGS. 3 and 4. The fact that each bowl has a cut-out section and, when joined together, the downwardly arcuate joint between the cut-out section permits food to be conveniently moved from one bowl to the other through cut-out sections to prevent spillage is a key advantage of the present invention.

The bases 14 of the bowls 12 are shown resting on grates 24 of stove 20 having adjustable burner control knobs 22. With the double wok configuration shown, a cook can prepare different dishes in each bowl 12, at different heat levels if necessary and, if desired, the different prepared ingredients can easily be combined in one of the bowls 12 at the appropriate time.

Figure 3:
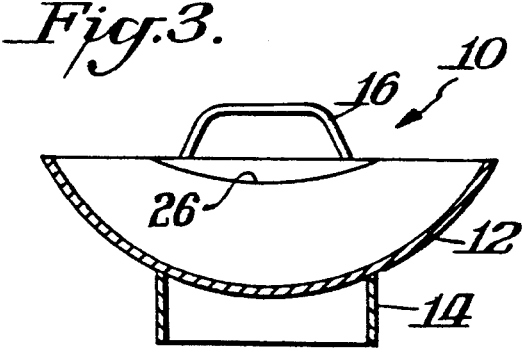
FIG. 3 is a cross-sectional view, partly broken away, of the double wok configuration taken along line 3—3 of FIG. 1.

FIG. 3 is a cross-sectional view, partly broken away, taken along line 3—3 of FIG. 1. Handle 16 and base 14 are shown for completeness.

FIG. 4 is a perspective view of the double wok configuration 10 affixed together at an intersecting joint 26 therebetween, wherein the intersecting joint 26 lies in the plane of connection between the bowls 12—12. The intersecting joint is arcuate downwardly as shown. The apparatus has a cut-out portion formed in a rim of each bowl adjacent the intersecting joint and forms the arcuate, downwardly extending intersecting joint when the apparatus is in the cooking position. The cut-out in each bowl mates to form the joint, thereby allowing cooked or partially cooked foods and juices to be shifted easily from one wok to the other through the joint by the cook, using a spoon, spatula or other appropriate tool, with substantially no spillage.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. Multiple unit wok apparatus comprising two similar wok bowls affixed together at an intersecting joint therebetween, wherein said intersecting joint lies in the plane of connection between said bowls, said intersecting joint being arcuate downwardly, said apparatus having a cut-out portion formed in a rim of each bowl adjacent said intersecting joint and forming said arcuate downwardly extending intersecting joint when said apparatus is in the cooking position, and said cut-out in each bowl mates to form said joint, thereby allowing cooked or partially cooked foods and juices to be shifted easily from one wok to the other through said joint by the cook, using a spoon, spatula or other appropriate tool, with substantially no spillage.

2. The apparatus of claim 1 having two similar wok bowls.

3. The apparatus of claim 1 wherein means for said wok bowls being affixed together are weld means.

4. The apparatus of claim 1 wherein means for said wok bowls being affixed together are cast means.

* * * * *